United States Patent [19]

Tackett

[11] 4,139,071

[45] Feb. 13, 1979

[54] ELECTRICALLY OPERATED VEHICLE AND ELECTRIFIED ROADWAY THEREFOR

[75] Inventor: Louis E. Tackett, Grandview, Tex.

[73] Assignee: UNEP3 Energy Systems, Inc., Grandview, Tex.

[21] Appl. No.: 773,276

[22] Filed: Mar. 1, 1977

Related U.S. Application Data

[60] Continuation-in-part of Ser. No. 662,127, Feb. 27, 1976, abandoned, which is a division of Ser. No. 579,131, May 20, 1975, abandoned.

[51] Int. Cl.² .......................... B60L 5/00; B60L 9/00; B60M 7/00
[52] U.S. Cl. .................................. 180/2 R; 180/66 B; 191/1 R; 191/22 C; 191/21; 191/2; 219/213
[58] Field of Search ................. 180/2, 66 B; 219/213; 191/1 R, 2, 4, 21, 10, 22 C; 152/330 C

[56] References Cited

U.S. PATENT DOCUMENTS

| | | | |
|---|---|---|---|
| 575,346 | 1/1897 | Grunow | 191/21 |
| 1,859,343 | 5/1932 | Rouge | 191/1 R |
| 1,904,611 | 4/1933 | Boyette | 180/66 B |
| 1,963,091 | 6/1934 | Jenkins | 180/66 B |
| 2,001,357 | 5/1935 | Guignard | 191/2 X |
| 3,047,701 | 7/1962 | Frungel | 219/213 |
| 3,065,380 | 11/1962 | Huffman | 191/1 R X |
| 3,339,653 | 9/1967 | Chaplenko | 191/22 C |
| 3,637,956 | 1/1975 | Blackman | 180/2 X |
| 3,865,169 | 2/1975 | Tsuruta | 152/330 C |
| 3,914,562 | 10/1975 | Bolger | 191/10 |

*Primary Examiner*—Kenneth H. Betts
*Attorney, Agent, or Firm*—James L. Bean

[57] ABSTRACT

A roadway having a smooth road surface for automotive vehicles includes means for transmitting electric current through the road surface to electrically-operated vehicles travelling thereon. Each electrified traffic lane is provided with at least two spaced parallel electrical contact assemblies mounted with their top surfaces flush with the road surface and in position to be contacted one with a wheel on each side of the vehicle, with the contact assemblies each requiring a predetermined weight thereon to maintain electrical contact with the vehicle wheels. The vehicle employs electrically-conductive tires which roll on the electrically-conductive surface of the contact assemblies, and the current thus picked up is transmitted, through rolling-sliding contacts, conductors, etc. to controls for controlling the operation of the vehicle through individual wheel motors. The vehicle motors may be electric, but preferably are hydraulic or pneumatic motors which are driven as pumps or compressors during deceleration to thereby conserve energy, with the electric current driving a suitable pump or compressor to supply motive fluid through suitable pressure storage reservoir to the wheel motors during acceleration and normal driving. A battery pack is included for supplying current to operate the vehicle when the wheels are not on the contact assemblies, which battery pack is charged from current picked up from the roadway during normal operation or from special re-charging pads while the vehicle is parked.

40 Claims, 11 Drawing Figures

ELECTRICALLY OPERATED VEHICLE AND ELECTRIFIED ROADWAY THEREFOR

CROSS-REFERENCE TO RELATED APPLICATIONS

This is a Continuation-in-Part of my co-pending application Ser. No. 662,127 filed Feb. 27, 1976, now abandoned as a Division of prior application Ser. No. 579,131 filed May 20, 1975 and now abandoned.

BACKGROUND OF THE INVENTION

1. Field of the Invention

This invention relates to electrically-operated automotive vehicle systems, and more particularly to an improved electrically-operated automotive vehicle and an electrified roadway over which the vehicle may operate and which supplies electric current to the vehicle.

2. Description of the Prior Art

Electrically-powered automotive vehicles which are operable on smooth road surfaces are well-known and conventionally comprise a storage battery pack which supplies the electrical energy for operating the vehicle on the open road, with the vehicle including charging circuitry to enable recharging of the batteries as by plugging into a conventional electrical outlet. Such vehicles provide pollution-free and economical transportation, but generally are seriously limited in the distance they can travel between battery charges, and operating the vehicle for the maximum time between battery recharging greatly reduces battery life.

Electrically-operated vehicles are also known which are capable of operating both from a battery pack and from an outside source of electrical power such as overhead trolley wires or energized trolley rails, tracks or the like. However, maneuverability of such vehicles has generally been severely limited and the battery-operation has generally been intended only for a limited use as for transferring between trolley lines, turning the vehicle, or other short maneuvers. Accordingly, such vehicles have generally not been found satisfactory for general public use.

Another known electrically-operated vehicle employs a battery pack for supplying the power to the electric motor drive, with an alternate, self-contained power source such as an internal combustion engine being provided to drive a generator for re-charging the batteries and/or providing electrical energy to the drive motors when not operating on the batteries. While this system overcomes the inherent range limit of vehicles powered by batteries alone, the system is relatively expensive to construct, inefficient to operate, and only partially avoids the air pollution problem of conventional internal combustion engine-operated vehicles.

It is also known, for example from U.S. Pat. No. 1,859,343, to provide an electric motor-driven vehicle with electrically conductive tires which contact a series of conductors imbedded in the top surface of a roadway to complete an electric circuit between the imbedded conductors and an overhead line which is engaged by a trolley. The vehicle is able to maneuver over the width of the roadway, within the confines of the imbedded conductors, so long as the trolley maintains electric contact with the overhead line. This patent also discloses the use of an engine-driven generator as an alternate power supply to enable the vehicle to proceed from the specially-designed roadway onto an ordinary road surface.

From the above, it is seen that the prior art electrically-operated automotive vehicles have generally been inherently limited in some respects which have prevented their wide-spread acceptance. It is, therefore, the primary object of the present invention to provide an improved electrified transportation system including a new and improved electrically-operated automotive vehicle and electrified roadway over which the vehicle is operated and which will overcome the limitations of the prior art as discussed above.

Another object of the present invention is to provide an improved electric transportation system which includes an improved electrified roadway over which conventional motor vehicles may be operated with safety and which includes means for providing electric current through the wheels of an improved electrically-operated motor vehicle to operate the vehicle over the roadway.

Another object of the invention is to provide such an improved roadway having spaced parallel electrical contact assemblies with electrically-conducting upper surfaces thereon which are energized successively in predetermined section lengths only upon the application of a predetermined load on the conducting surface.

Another object of the invention is to provide an electrified roadway for providing electric energy to vehicles operating thereon and incorporating improved electric heating means for automatically de-icing the roadway.

Another object of the present invention is to provide an improved electrically-operated motor vehicle which incorporates a battery pack to enable operation of the vehicle on conventional road surfaces and separate extensions of the vehicle electrical circuit which enable the vehicle to pick up current and close an electrical circuit, from at least two normally "dead", separated conductive plates flush imbedded in the roadway surface of each traffic lane, through the vehicle wheels.

Another object is to provide an improved transportation system including an electrically operated vehicle and an electrified roadway including means for supplying electric energy to the vehicle operating thereon, and which vehicle includes battery means for operating the vehicle when off the electrified roadway.

A further object is to provide such a transportation system in which the batteries are automatically maintained at or near full charge when operating the vehicle on the electrified roadway to enable greater freedom of operation of the vehicle and to greatly extend the battery life.

SUMMARY OF THE INVENTION

In the attainment of the foregoing and other objects and advantages of the present invention, an important feature resides in providing an electrified roadway having a substantially smooth top road surface and including at least two spaced, parallel electrical pressure contact assembly strips extending longitudinally of each traffic lane and spaced apart a distance such that a motor vehicle moving thereover may have one wheel rolling along each of the two contact assembly surfaces. Electrical current is provided to the contact assemblies by elongated conductors extending beneath and spaced slightly below a contact strip carried by the top conducting surface portion of the assembly, and the top surface is resiliently retained in position so as to normally avoid electrical contact. The resilient force is overcome by the weight of a vehicle wheel, depressing the top surface to provide electrical contact only in the area of the contact and only upon the application of a predetermined weight on the contact strip. Electric current is supplied to the conductors at spaced intervals along the length of the roadway from any suitable source such as the electric energy generating system disclosed and described in my co-pending patent application Ser. No. 728,064, now U.S. Pat. No. 4,118,637, the disclosure of which is incorporated herein by reference.

The motor vehicle according to the present invention may be of conventional overall structural configuration and size, with at least two of the spaced wheels, for example the front steered wheels, being provided with suitable electrically conductive tires such as those disclosed in German Pat. No. 2 443 493, mounted on a non-conducting wheel structure. A rolling-sliding assembly mounted on a fixed part of the vehicle making electrical contact with an annular connector rotating in electrical contact with the tire completes an electrical circuit from the two contact assembly strips, through suitable controls, to operate the vehicle. The vehicle is provided with at least two, and preferably four, individual wheel drive motors which may be electrical, but preferably are fluid motors which are driven as pumps during deceleration of the vehicle to capture and store energy required to decelerate or stop the vehicle. The vehicle incorporates a battery pack which is connected in the control circuitry to operate the vehicle when the electrically-conductive wheels are not in position on the energized contact assembly strips. The battery pack is automatically recharged, from energy derived from the contact assembly strips, during operation over the roadway according to the present invention, and during parking on short lengths of contact assembly strips imbedded in vehicle parking space paving.

In the preferred embodiment of the invention chosen for illustration, the vehicle is powered by pneumatic motors driving the individual wheels, with the pressure air being supplied from a compressor driven by an electric motor. An air accummulator, or reservoir, carried by the vehicle maintains sufficient compressed air to allow a greater than normal vehicle acceleration rate and to continue smooth operation of the vehicle in the event of momentary interruption of electrical current, thereby providing an important safety feature of the vehicle. Further, driving the individual wheel motors as compressors will automatically return compressed air to the reserve tank during braking of the vehicle so that energy required for braking is salvaged and subsequently used for driving the vehicle.

BRIEF DESCRIPTION OF THE DRAWINGS

Other objects and advantages of the invention will become apparent from the detailed description thereof contained hereinbelow, taken in conjunction with the drawings, in which.

DESCRIPTION OF THE PREFERRED EMBODIMENTS

Figure 2:
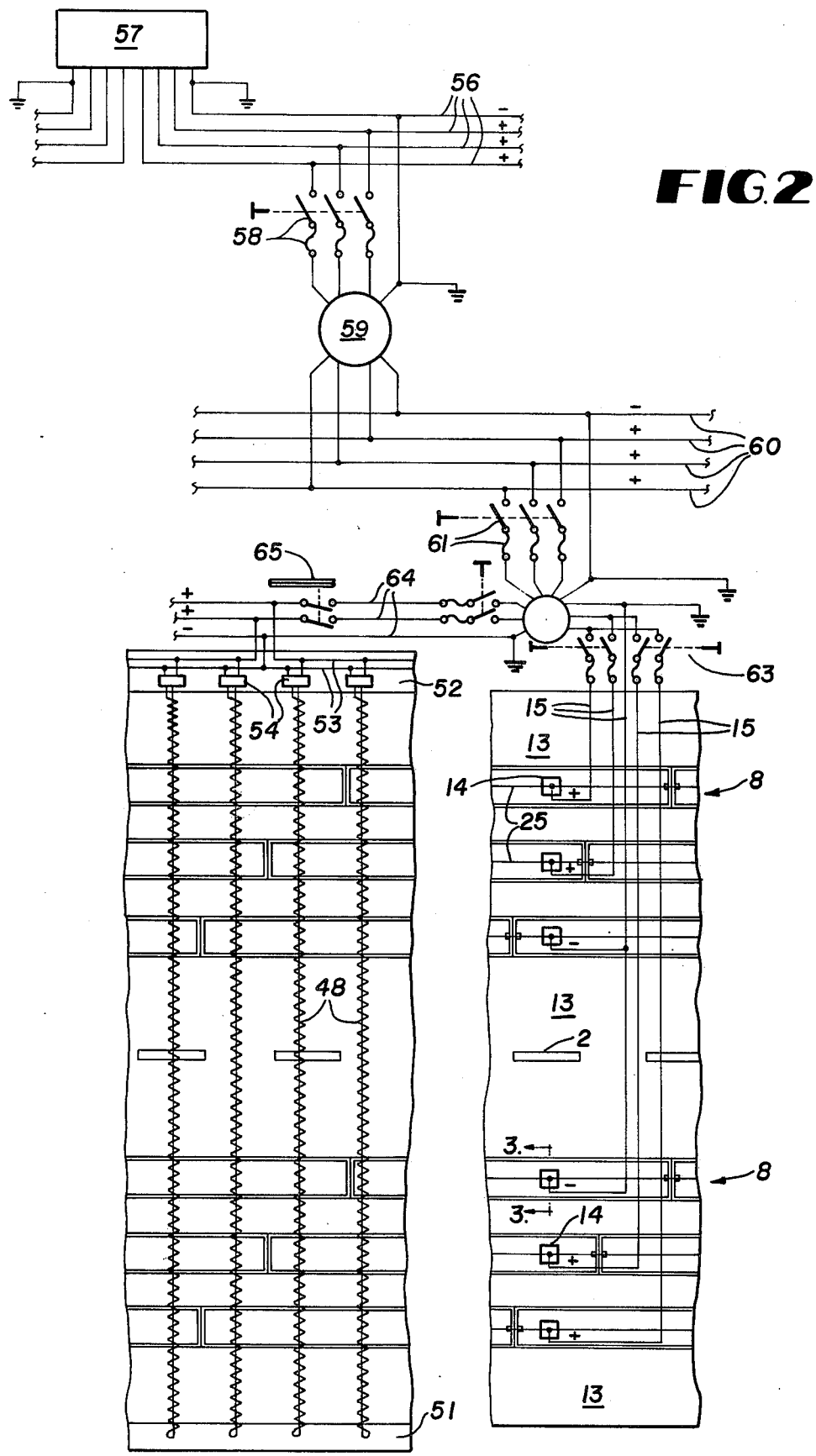
FIG. 2 is an electrical schematic wiring diagram for the electrified roadway according to the invention.
Figure 3:
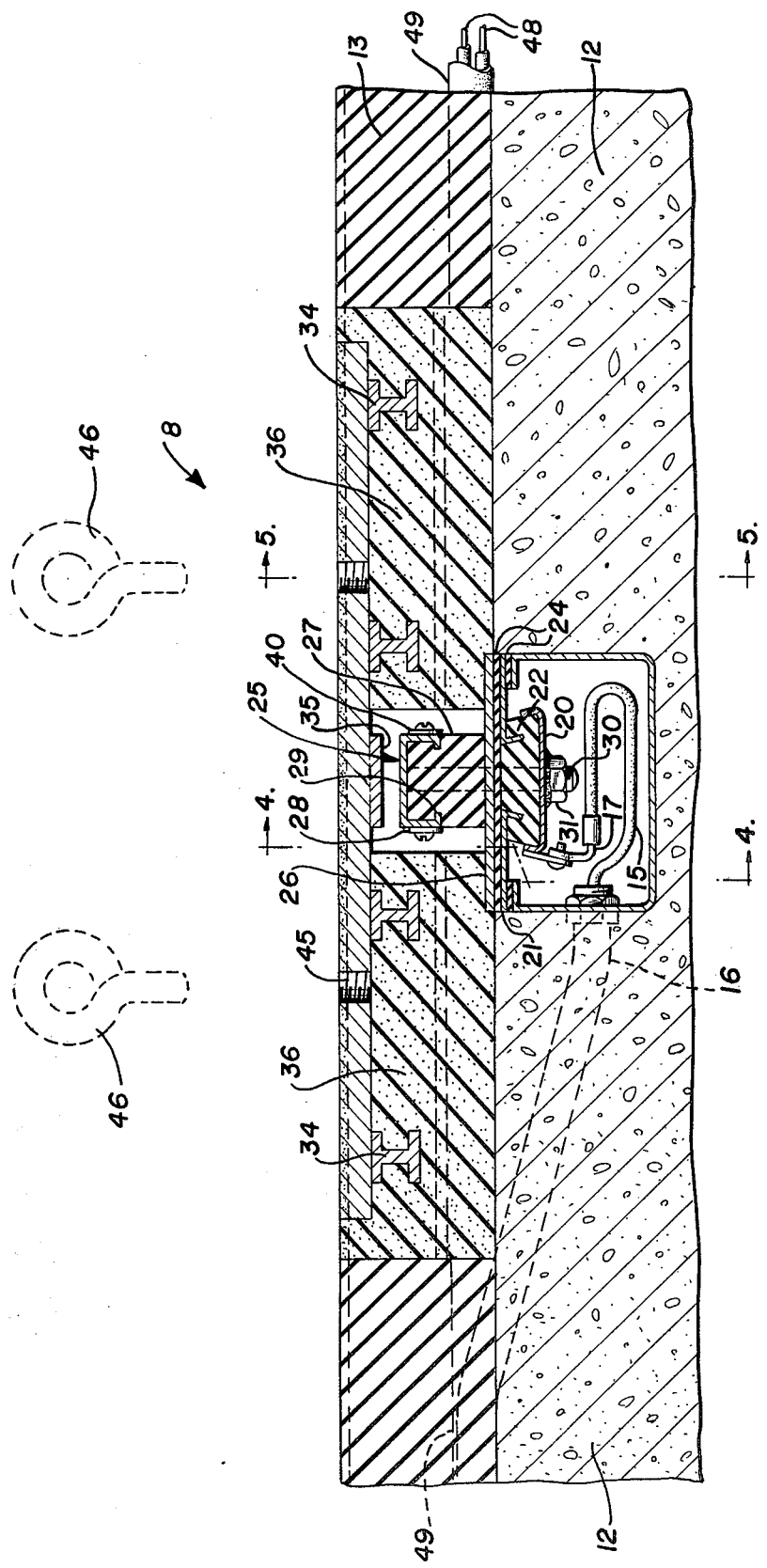
FIG. 3 is a fragmentary sectional view, on an enlarged scale, taken on line 3—3 of FIG. 2.
Figure 4:
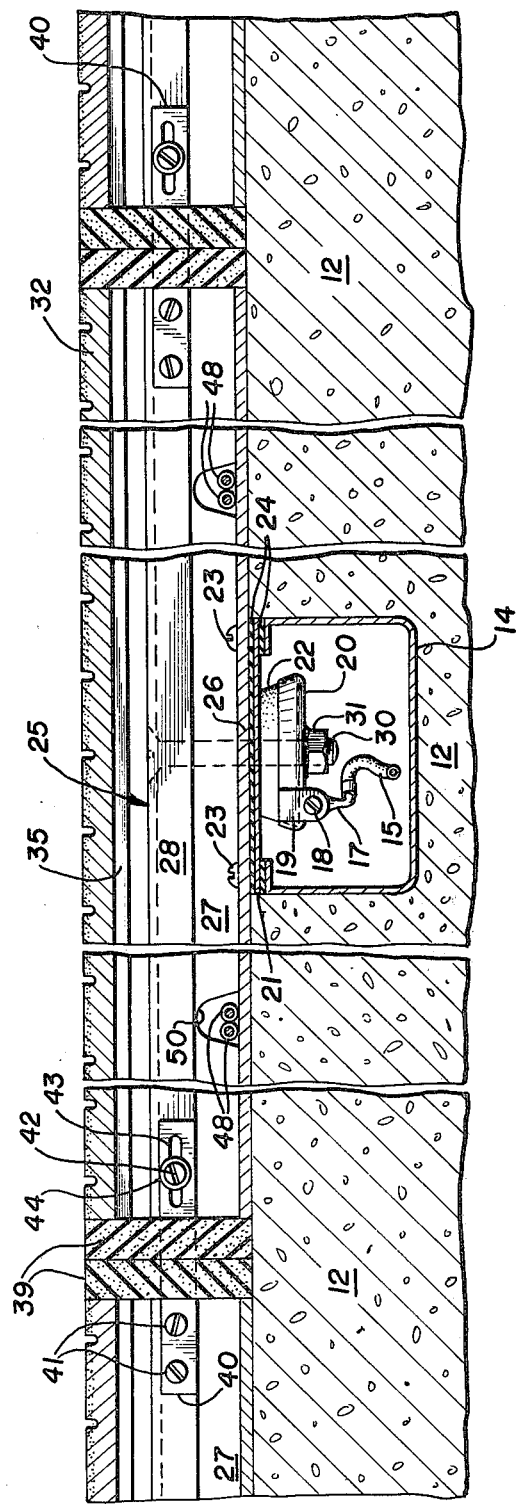
FIG. 4 is a fragmentary sectional view taken on line 4—4 of FIG. 3.
Figure 5:
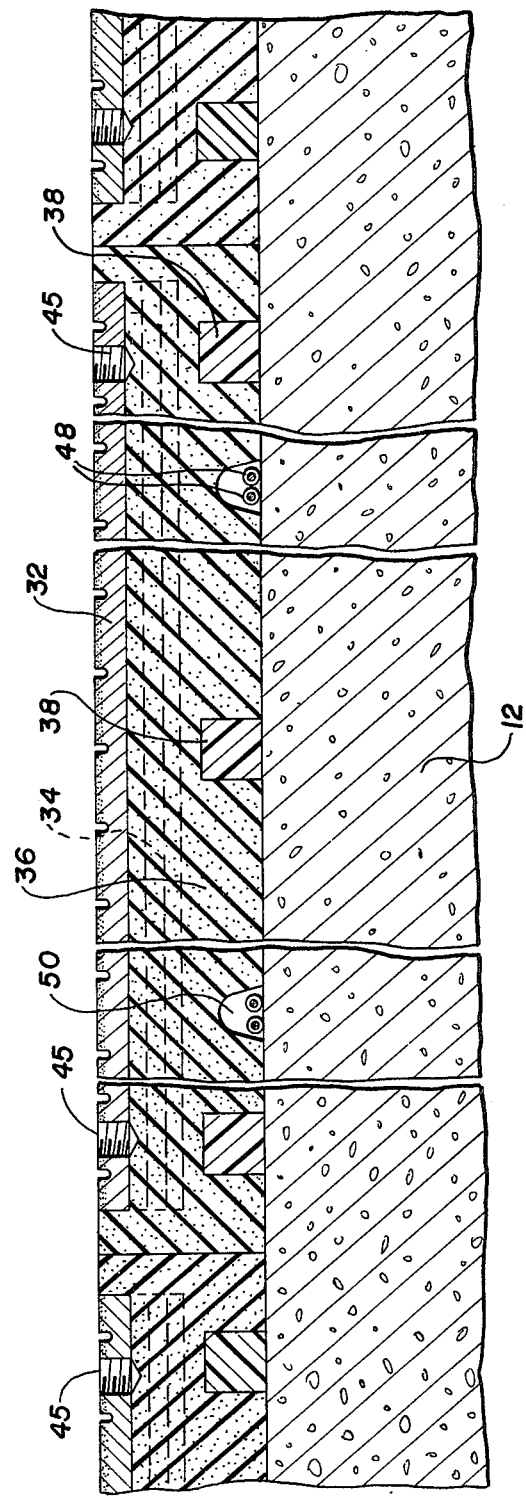
FIG. 5 is a fragmentary sectional view taken on line 5—5 of FIG. 3.

Referring now to the drawings in detail, an electrified roadway according to the present invention is designated generally by the reference numeral 1 and is illustrated as having the conventional centerline marker 2 dividing the road into two traffic lanes 3 and 4, each intended to carry traffic in the direction of the arrows 5. An electrically operated car 6 is illustrated in traffic lane 3, with the car having two electrically conductive tires 7 one each in contact with the outermost of three parallel laterally-spaced electrical contact plate assemblies 8 running, in isolated sections, the length of the roadway. As illustrated in FIG. 2, and more fully described hereinbelow, the two outer electrical conducting assemblies are normally provided with relatively positive electrical current while the conducting assembly nearest to the roadway centerline is normally provided with relatively negative current. The truck 9 illustrated in traffic lane 4 is provided with a spring-pressed castered wheel 10 mounted on the vehicle centerline, with the castered wheel and the two front wheels each having mounted thereon electrically conductive tires 7, one contacting each of the three parallel conductive plate assemblies 8.

As illustrated in FIGS. 3–6, the roadway 1 preferably consists of a rigid reinforced concrete or other suitable rigid base slab 12 having a molded, non-conductive wear surface layer 13 firmly bonded to the top of the base slab and extending the entire width of the roadway except in the areas occupied by the elongated contact assemblies 8. At spaced intervals along the length of the roadway, for example at approximately 1/10 mile intervals, open-topped metal junction boxes 14 are imbedded in the top surface of the concrete base slab 12, with one junction box 14 being located on the centerline of each of the spaced, parallel electrical contact assemblies in each electrified traffic lane of the roadway. Electric current is supplied to the respective junction boxes 14 by wires 15 which are led to the junction boxes through conduits 16. Each traffic lane is provided with a three-wire circuit, with a positive charge wire leading to two of the junction boxes in each lane and a negative charged wire leading to the third junction box in each lane as indicated in FIG. 2. Since the electrical connections and structure located within each of the junction boxes 14, and the structure of the electrical contact assemblies 8 passing over the respective junction boxes are identical, only one will be described in detail, it being understood that the description applies equally to all such structure.

Within the respective junction boxes 14, the wires 15 are connected, through conventional connection clips 17 swaged onto the end of the wire and a screw 18, to a lug 19 welded to a contact plate 20 which, in turn, is maintained in spaced relation to and electrically insulated from a rigid metal cover plate 21 by an insulation block 22. The cover plate 21 is mounted on the junction box 14 by suitable means such as screws 23, and a resilient rubber-like gasket 24 which provides a water-tight seal for the top of the junction box.

The electrical contact assemblies 8 are each made up of a series of substantially identical elongated, relatively narrow base sections 25 joined together in end-to-end relation, each consists of a relatively thin metal base plate 26 extending throughout a major portion of the length of the base sections. The base plate 26 has a width substantially equal to the width of the junction boxes 14. A generally rectangular, elongated hot-bar support beam 27 formed from an electrically-insulating material such as hard rubber is mounted on the top of and extends the length of base plate 26 along the longitudinal centerline of the base sections 25. Suitable securing means such as lugs (not shown) extend from the base plate 26 into the material of the beam 27 to rigidly join the support beam on the base plate.

An inverted, channel-shaped hot-bar, or electrical contact plate 28 extends the full length of and is rigidly mounted on the top surface of support beam 27 by crimping the downwardly extending flanges of the channel 28 into the material of the beam 28 when cast, as shown at 29. Electrical contact is established between the contact plate 20 in junction box 14 and the base section 25 positioned directly thereabove by a bolt 30 extending therethrough and which threadably engages a nut 31 welded onto the surface of plate 20.

The base plates 26 of the respective base sections 25 are secured to the top surface of the concrete base slab 12 by suitable means such as explosive-driven fasteners, with the base plates being longitudinally aligned along the roadway and slightly spaced from one another for reasons pointed out hereinbelow. For example, in a typical installation, the base section 25 may have an overall length of 20 feet, with the base plates 26 having an overall length of 19 feet 11 inches, with a one inch space being provided between the ends of the base plates and the hot bar and support beam carried thereon of the adjacent base sections. In securing the base plates to the support slab 12, one base plate is centered over a junction box 14, with screws 23 extending downwardly through openings in the base plate, through the cover plate 21 and gasket 24 to securely clamp the base plate in position relative to the cover plate. Bolt 30 is then threaded through the hot bar and hot bar support beam into the nut 31.

Each base section 25 is covered by pressure contact top sub-assembly having an elongated top plate 32 formed from a corrosion-resistant metal and preferably having anti-skid particles and grooves rolled into its top surface, which top surface defines the contact surface for supplying electrical current to the conductive tires 7 on vehicles travelling over the roadway. The plate 32 in the example of the sub-assembly described above may have an overall length corresponding to the length of base plate 26, i.e., 19 feet 11 inches and a width of, for example, 12 inches, with the width of the assembly being for example 13 inches. The plate 32 is reinforced along its length on its underside by a plurality of structural members such as beams 34 rigidly welded to the plate and projecting downwardly therefrom. An electrical contact bar 35 is rigidly joined to the undersurface of the top plate 32, with the contact bar 35 having a length and width corresponding to the width and length of hot bar 28 and being located on the longitudinal centerline of the top plate 32 for contact with the hot bar in the manner described hereinbelow.

The top plate 32, with the structural beams and contact bar thereon is imbedded in a flat, rectangular bed of semi-soft insulating rubber-like material 36, with the top surface of the plate 32 being flush with the surrounding edges of the semi-soft rubber-like supporting material and with the reinforcing beams 34 being imbedded in the cast material 36. A longitudinally-extending groove, having a width slightly greater than the width of the hot bar 28 and the contact bar 35, extends along the longitudinal centerline of the rectangular rubber bed 36, with the groove terminating at the ends of the hot bar so that, when the sub-assembly is positioned on the roadway, the hot bar is received within the groove 37 in opposed relation to the contact bar 35. In production, the top plate 32, structural beams 34 and contact bar 35 are rigidly assembled and positioned in the bottom of a mold in upside-down relation to provide a firm bond with the underside and side edges of the top plate and completely imbedding the reinforcing beams 34.

Figure 6:
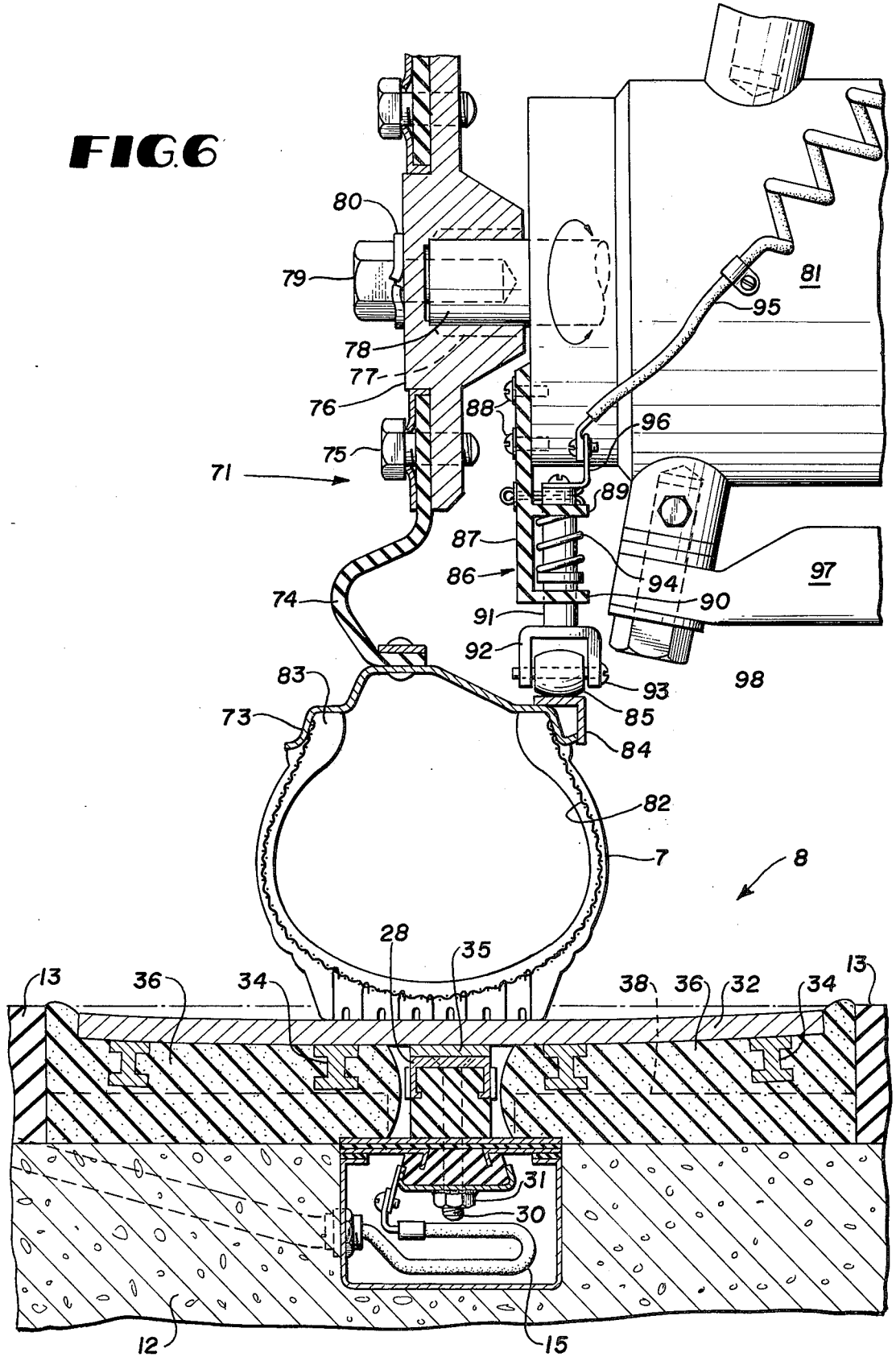
FIG. 6 is a fragmentary sectional view similar to FIG. 3 and illustrating one wheel of an electrically operated vehicle according to the invention in operative position on the roadway.

As the top plate 32 and resilient supporting bed 36 are cast, a plurality of transversely extending furring members 38 each formed from a rigid electrically-insulating material such as formica or the like are imbedded in the resilient rubber-like material, with the furring members being arranged in opposed pairs one on each side of the slot 37 and extending from the slot to a position outboard of the outer reinforcing beam 34. The furring members 38 have their bottom surface flush with the surface of the bed of rubber-like material 36 so that, when installed on the roadway, the furring members will rest directly upon the top surface of the base slab 12. As best seen in FIG. 6, the inner ends of the furring members 38 have their bottom surface notched to overlie and rest upon the edges of the base plate 26.

The furring members 38 are preferably square or rectangular in cross-section and have a vertical dimension such that, when the bed 36 of rubber-like material is not compressed, the top surface of the respective furring members is spaced slightly below the bottom surface of the reinforcing beams 34.

The top plate 32 and its resilient supporting bed structure is adapted to be cemented down on top of the roadway base slab with the center void sitting over the hot bar 28 and the support beam 27, and with a relatively narrow section 39 of the resilient rubber-like material extending between the ends of the hot bar and support beam. In this position, the electrical contact bar 35 on the under surface of the top plate 32 is spaced slightly above the hot bar, the spacing corresponding to the spacing between the top of the furring members 38 and the bottom of the reinforcing beams 34. Thus, with the hot bar energized, the top plate will, nevertheless, be normally de-energized, i.e., normally dead, and energized only when sufficient weight is applied to the top plate to compress the semi-soft bed of rubber-like material 36 sufficiently to establish electrical contact. At the same time, the structural beams 34 will be depressed to engage the top of the furring members 38 to thereby prevent the entire weight of a vehicle passing over the top plate from being carried by the hot bar support beam. The resilience of the rubber-like material supporting the plate is such that the weight required to depress the plate will be relatively high, for example 300 pounds or more, at any point along the length of the plate whereby it whould be impossible for any one pedestrian to depress the plates on two parallel contact assemblies to complete an electrical circuit.

As stated above, the top sub-assemblies are arranged in end-to-end relation, with adjacent sub-assemblies between junction boxes 14 being cemented together at the end faces to provide a continuous water-tight structure. The adjacent sub-assemblies are electrically connected by splice bars 40 which extend through the semi-soft rubber material at the end sections 39. Each splice bar 40 has one end rigidly connected to the side face of the hot bar 28 in one sub-assembly, as by screws 41, and has its other end slidably connected to the end of the hot bar in the adjacent sub-assembly. This is accomplished by a screw 42 extending through an elongated slot 43 adjacent the end of the splice bar, with a spring washer 44 firmly holding the splice bar in contact with the hot bar while permitting limited sliding movement therebetween. However, in order to permit isolation of segments of the electrical contact assemblies, along the length of the roadway, the segments thereof serviced by the individual junction boxes 14 have the sub-assemblies thereof electrically joined by splice bars, with one splice bar being omitted between the segments serviced by adjacent junction boxes at a point substantially midway between the respective junction boxes.

Since the base sections 25 and the top sub-assemblies therefor will be prefabricated under controlled manufacturing conditions rather than field-assembled, it will be possible to accurately control the spacing between the hot bar 28 and the electrical contact bar 35. Thus, while for clarity the spacing is illustrated in the drawings as being relatively large, in practice this spacing will be very small so that vehicle control will not be adversely affected in running onto and off of the contact assemblies.

To assist in handling the relatively heavy top sub-assemblies, and to facilitate removing them from the roadway for maintenance purposes, each top plate 32 has drilled and topped openings 45 formed therein, at least one adjacent each corner. A lifting eye 46 may be threaded into the openings to permit easy attachment of a hook on a lifting crane. Once the sub-assembly is in position for use on a roadway, the lifting eye 46 is removed and, if desired, a suitable bolt or screw may be threaded into the opening, with the top head of the bolt flush with the top surface of the plate.

Referring still to FIGS. 2–5, it is seen that the roadway according to the present invention may be provided with electric de-icing where necessary as in northern climates, or on bridges, overpasses, or the like which freeze more readily even in moderate climates. The de-icing system consists of a series of transversely extending conventional resistance-type insulated heating wire loops 48 preferably positioned adjacent the top surface of the base slab 12. The spacing between adjacent heating loops 48 will, of course, vary depending upon the region and conditions under which the roadway is installed. The individual heating loops 48 are mounted within and extend through suitable conduits 49 positioned on top of a base 12 and job molded or cast within the electrically insulating wear surface 13. However, the conduits do not extend across the contact assemblies, but rather the molded insulating resilient bed 36 has integrally formed therein downwardly opened arcuate channels 50 positioned to be aligned with the conduits 49. Waterproof wire-ways 51, 52 are provided one along each side of the roadway, with the wire-ways preferably having a sectional removable top cover (not shown) to permit ready access to the wire-ways to enable the heating wire loops 48 to be pulled through the conduits 49 and channel 50. Also, each heating wire loop is connected to the electric supply lines 53 running through the wire-way 52 on one side of the roadway through voltage limiting miniature transformers 54. The electrical wires in the wire-way are preferably in a two-wire circuit with conventional electric plug-in type connection points at each heating wire loop connecting point for convenient plug-in connection and removable replacement of the electrical heating tape loops.

Referring now to FIG. 2, it is seen that the electrified roadway according to the present invention is energized from conventional high-voltage A.C. electrical wiring circuits 56 from electrical generating station outlets, indicated generally by the reference numeral 57, and leading to conventional switched and fused connections or circuit breakers, indicated generally at 58, to transformers 59 in primary electric service manholes at spaced intervals, for example ½ mile center-to-center, at convenient places near roadways to be electrified. Conventional secondary or intermediate voltage A.C. electrical wiring 60 from the primary-secondary voltage transformers 59 in primary service manholes lead through switched and fused connections 61 of secondary-service voltage transformers 62 in secondary service manholes located at spaced intervals, for example 1/10th mile centers-to-centers, alongside the highway to be electrified. From the service voltage manholes, three-wire highway electrification circuits 63, including two positive wires and one negative ground wire 15, each insulated and in the individual electrical conduits 16, extend transversely of the roadway and are connected one each to the respective junction boxes 14. From the service voltage transformer 62 in the manholes alongside the roadway, separate service-voltage wires 64 extend through double-throw, adjustable, thermostatic control switches 65 and suitable conduits parallel to the roadway for servicing the electric heating elements, where employed, with fused switches for circuit wiring 64 and 63.

Figure 1:
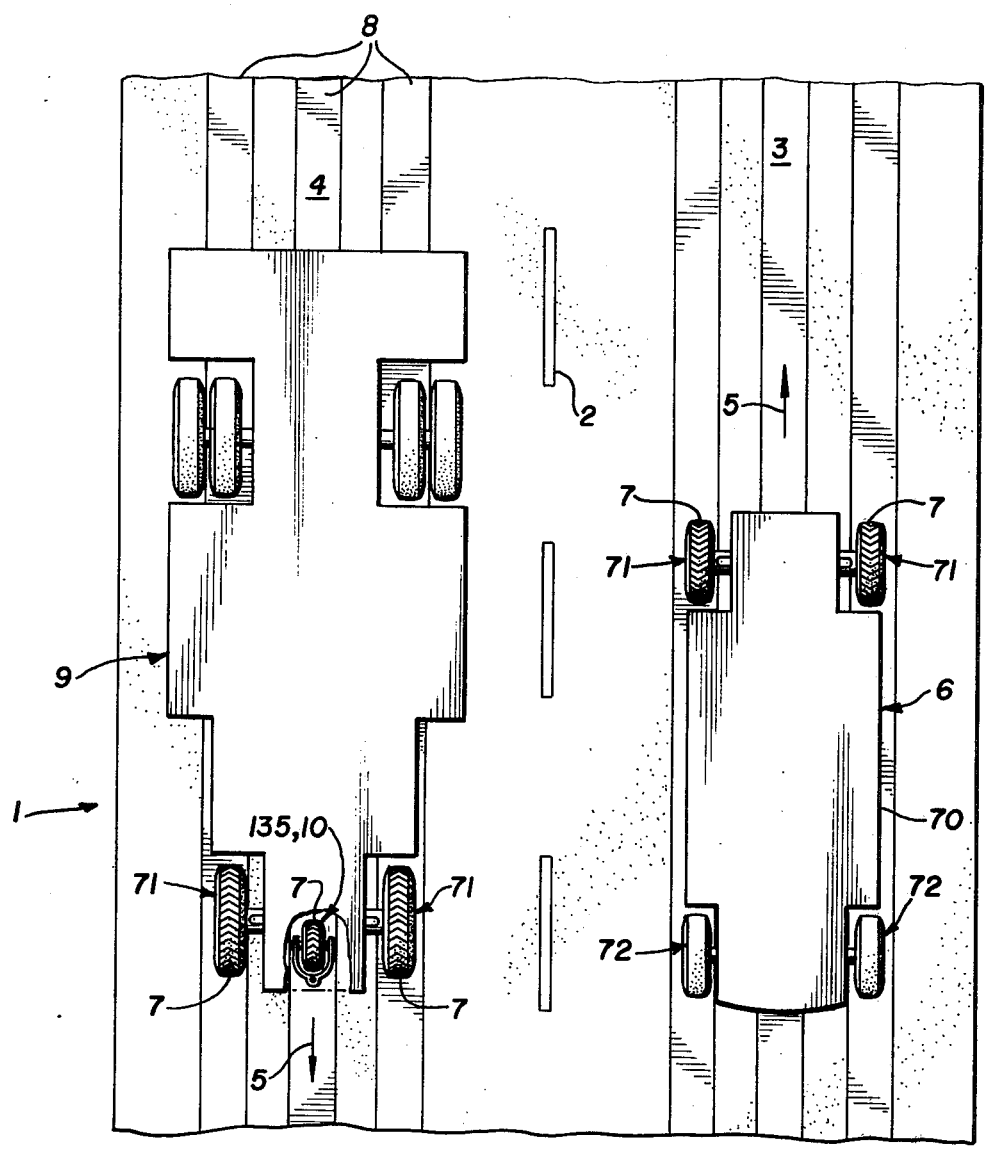
FIG. 1 is a plan view schematically illustrating a two-lane electrified roadway according to the invention and illustrating two electrically operated vehicles travelling in opposite directions thereon.
Figures 7, 8:
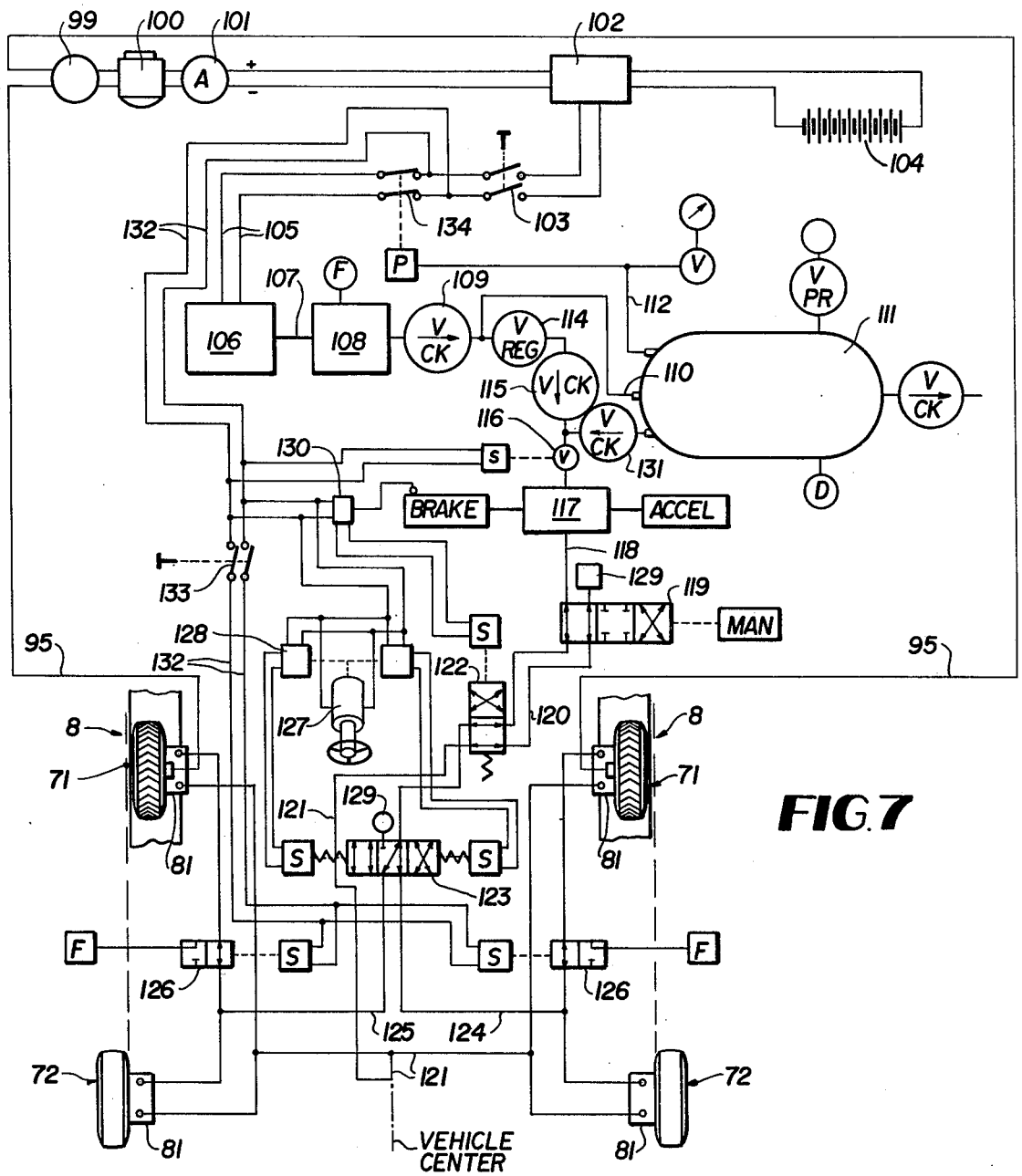
FIG. 7 is a schematic electrical and pneumatic flow diagram illustrating the power system and the controls of a vehicle according to the invention.
FIG. 8 is a view similar to a portion of FIG. 7, and showing a modification thereof to convert the vehicle power circuit from a two- to a three-wire system.

Referring now to FIGS. 1, 6 and 7, an electrically operated motor vehicle 6 according to the present invention, and especially adapted for operation on the electrified roadway described above, is illustrated as including a frame 70 supported for movement over a roadway by laterally spaced front-steered wheels 71 and rear wheels 72. The front wheels 71 are each provided with an electrically conductive tire 7 mounted on and in electrical contact with a metal rim 73 which, in turn, is supported on a non-conductive flange 74. The flange 74 is mounted, as by lug bolts 75, on a central hub 76 which is rotatively fixed by a splined connection 77 on the end of axle 78. Lock bolt 79 and washer 80 retain the hub on the axle 78 which is actually the driven shaft of a pneumatic motor 81. Each wheel, both front and rear, of the vehicle are preferably driven by a separate air motor 81, though if desired, the vehicle may be driven by only two wheels, for example the rear wheels. Also, while the vehicle 6 is illustrated as having only the front wheels equipped with electrically conductive tires 7, it is believed apparent that both front and rear wheels may be so equipped if desired.

As best seen in FIG. 6, the tires 7 are inflatable or pneumatic tires of conventional overall configuration, but are provided with a network of electrically conductive metal strands 82 in the sidewalls and tread, with the strands 82 being exposed in the tread to provide electrical contact with the top surface of plate 32. The conductive strands are also exposed in the bead portion 83 of the tire in position to engage the wheel 73. Tires of this general construction are known and used, for example, on aircraft for the purpose of grounding the vehicle during take-off and landing operations.

In order to provide a path for the electrical current for the tire 7, the rim 73 has a radially inwardly directed annular track 84 on its inner periphery in position to be engaged by a rolling-sliding contact member 85 of a spring pressed pick-up assembly 86. The assembly includes an electrically insulating mounting bracket 87 rigidly mounted as by screws 88 on the body of motor 81. Bracket 87 includes a pair of inwardly directed parallel spaced flanges 89, 90 which support a yoke 91 for limited radial movement toward and away from the track 84. Yoke 91 has a fork portion 92 on its outer end which supports roller contact 85 on a shaft 93. A spring 94 normally resiliently urges the roller 85 into electrical contact with the track 84, and a wire 95, connected through bracket 96 to the radially inner end of the yoke, conducts the electric current to the vehicle's electrical circuitry described hereinbelow.

The pneumatic motor 81, steered front wheel 71 and the electrical pick-up assembly 86 are supported on a movable arm member 97, and by king pin 98, for suspension and steering movement in a known manner by conventional mechanisms forming no part of the present invention.

Referring now to FIG. 7, it is seen that the conductors or wires 95 from the respective front wheels 71 are connected to a rectifier and step-down transformer-converter 99 for preventing current reverse flow and reducing the voltage of the A.C. current from the electrified roadway and converting the current from A.C. to D.C. for use in the vehicle. From transformer 99, the D.C. current passes through an electric meter 100 for recording the amount of energy picked up by the system. Preferably the meter 100 is a counting, card coded, recording meter which is capable of retaining and recording the last previously read and the current meter reading to enable and facilitate periodic key-controlled meter readings for billing purposes. Downstream of the meter 100, an ammeter 101, a voltage regulator 102, and a manually controlled on-off (ignition) switch 103 are connected in the vehicle's power and control circuit. A battery pack 104 is connected in the circuit, through the voltage regulator 102, which voltage regulator includes conventional diode-controlled duplex shunt switches for instantaneously connecting the battery pack to supply power to the circuit upon interruption of power from the electrified roadway while preventing the reverse flow of current from the batteries through the conducting tires to ground, and for supplying charging current to the batteries to maintain them in a full-charge condition when current is supplied from the roadway.

From the ignition switch 103, current flows through a pressure-controlled, normally-open pressure-closed switch 134 through conductors 105 to the main drive motor 106. Motor 106 is connected, through a flexible coupling 107, to a three-stage air compressor 108 which supplies high pressure air through a one-way check valve 109 and conduit 110 to an air tank or reservoir 111. Pressure within the reservoir 111 is supplied through conduit 112 to pressure switch 134 so that when pressure in the reservoir 111 exceeds a predetermined desired level, the pressure will overcome the spring force of valve 104 to open the circuit to motor 106.

During operation of the vehicle, air may flow from the compressor 108 and check valve 109 through a pressure-regulating valve 114, a second one-way check valve 115, and a normally-closed solenoid-opened flow control valve 116 to an accelerator-brake valve 117. From the accelerator valve 117, air flows through line 118 to a manually-actuated vehicle attitude control valve 119. Pressure and return lines 120, 121 respectively, extend from the attitude valve 119 and are connected to pressure and returned ports of a two-position four-way spring biased solenoid-actuated reversing valve 122. From reversing valve 122, pressure line 120 is connected to a flow proportioning valve 123 indicated in the drawing as a three-position double solenoid-actuated spring centered valve which, in the normal operating condition, divides the pressure fluid flowing through line 120 in equal parts to lines 124, 125 for driving the wheel motors 81 on the right- and left-hand sides respectively of the vehicle, as viewed from the rear of the vehicle. Pressure lines 124 and 125, respectively, are each divided with a branch running to the front and rear wheels, respectively, with the branch of the respective lines leading to the front wheels each passing through a normally-open two-position two-way solenoid-actuated valve 126 which is normally spring-loaded to the open position and which is solenoid-actuated to the closed position blocking flow of air through the line and venting the front wheel pressure ports of motor 81 to atmosphere, thereby enabling the vehicle to operate in a free-wheeling condition more fully described hereinbelow. The solenoids of proportioning valve 123 are connected to the vehicle steering mechanism indicated generally by the reference numeral 127 so that actuation of the steering mechanism to turn the vehicle left or right will actuate limit switches or verniers 128 controlling the solenoids or other valve positioning means to proportion the flow of fluid to thereby reduce or vent the flow of fluid on the inside of a turn, thus eliminating the need for a differential drive.

Return line 121 leads from flow-reversing valve 122 to the exhaust ports of the fluid motors 81 of each of the four wheel drive motors. In normal operating of the vehicle, this return line is vented to atmosphere through attitude valve 119 through a suitable silencer 129. As indicated in the drawing, valve 119 may be manually shifted from the normal condition illustrated to the center or parking position blocking all flow of air to and from the wheel motors 81, and to the reverse position which reverses the flow direction in lines 121 and 122, to thereby reverse the direction of movement of the vehicle.

The acceleration-brake valve 117 is normally spring-biased to a closed position and is opened by a conventional foot pedal, with the amount of depression of the pedal controlling the rate of operation of the vehicle.

The valve includes a dash pot which controls both the speed of opening of the valve by the accelerator and closing of the valve by the spring pressure for braking. The effect of the dash pot may be limited or overcome by application of pressure to a brake pedal to more quickly close the valve. Actuation of the brake pedal closes a limit switch 130 which controls actuation of the solenoid of reversing valve 122. Shifting of valve 122 from the illustrated straight-through position to the reversing position connects return line 121 downstream of reversing valve 122 to the pressure line 120 upstream of the valve, and opens the inlet port of the wheel motors 81, through lines 124 and 125, proportioning valve 123, reversing valve 122 and attitude valve 119, to atmosphere, thereby converting the wheel motors 81 to compressors. As the wheel motor-compressors build up pressure in the return line, the resistance will apply a braking action slowing or stopping the vehicle. The braking action is controlled by adjustments in the accelerator valve 117 which includes a restricted orifice by-pass enabling reverse flow of compressed air from the wheel motor through one-way check valve 131 into reservoir 111, thereby salvaging braking energy normally lost.

Connected in the main drive motor circuit between ignition switch 103 and pressure switch 134 is a separate electric control circuit including wires 132 leading to a manually-actuated two-position free-wheeling switch 133 for controlling operation of the solenoid-actuated valves 126. The solenoid-actuated shut-off valve 116 is directly connected in this same control circuit upstream of the free-wheeling switch 133 so that, at any time when the ignition switch 103 is closed, valve 116 is opened.

Limit switch 130, controlling operation of solenoid-actuated reversing valve 122 and limit switches, or verniers 128 of steering mechanism 127, is also connected to the lines 132 between switches 103 and 133. Thus, at any time when ignition switch 103 is closed to energize the circuit through lines 132, solenoid-actuated reversing valve 122 is operable as is the limit switch or vernier control of proportioning valve 123. Conversely, when switch 103 is in the open or off position, all the control systems are inoperative and the vehicle is functionally inoperable.

Referring now to FIG. 8, a modification of the circuit just described is illustrated in which a three-wire power circuit is utilized as in trucks, buses and other heavy vehicles illustrated schematically at 9 in FIG. 1. In this embodiment, a wire 95' leads from each of the two front steered wheels and a third, relatively positive wire, also designated 95', leads from the electrically conductive tire 7 on the castered wheel assembly 135 mounted on the center of the truck 9. The castered wheel assembly 135 is free to rotate about a vertical axis and is normally spring-loaded into contact with the center contact plate assembly when the steered wheels 71' are in contact with the outermost contact plate assemblies 8. The castered wheel is resiliently pressed downward with sufficient force to depress the top plate 32 to establish electric contact between the hot bar 28 and the contact bar 35.

The three wires lead to transformer converter 99', through meter 100', ammeter 101' and voltage regulator 102' to manually-actuated switch 103'. From the voltage regulator 102', the relatively negative ground wire leads to each of two separate battery packs 104', with the relatively positive wires leading one to each of the positive terminal of the respective battery packs. From the manually-actuated ignition switch 103' the three-wire circuit leads through pressure-actuated switch 134' to the main drive motor 106'. The two-wire circuit 132 described hereinabove is connected to the ground wire and one of the positive wires of the three-wire system between the switches 103' and 134'. The two-wire control circuitry of this vehicle is identical to that described above, the only difference being in the three-wire system for supplying motive power to the main drive motor and for charging the two separate battery packs.

Figure 10:
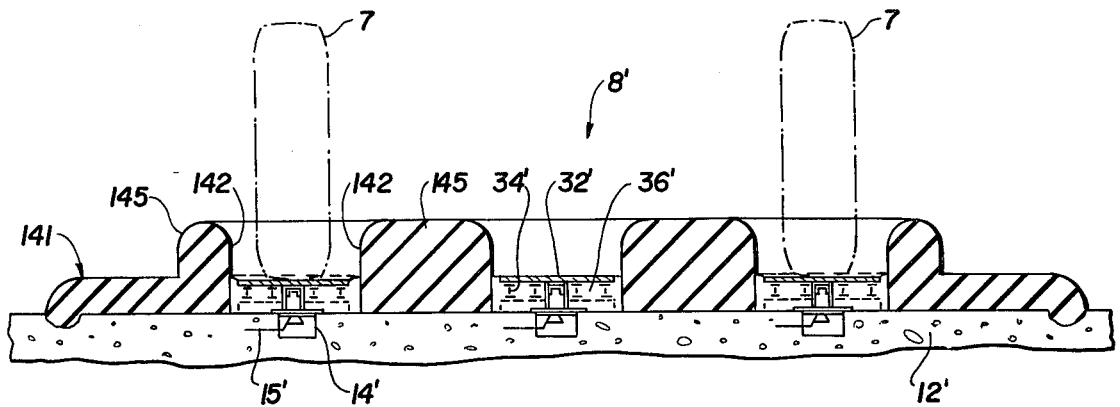
FIG. 10 is a sectional view taken on line 10—10 of FIG. 9.
Figure 11:
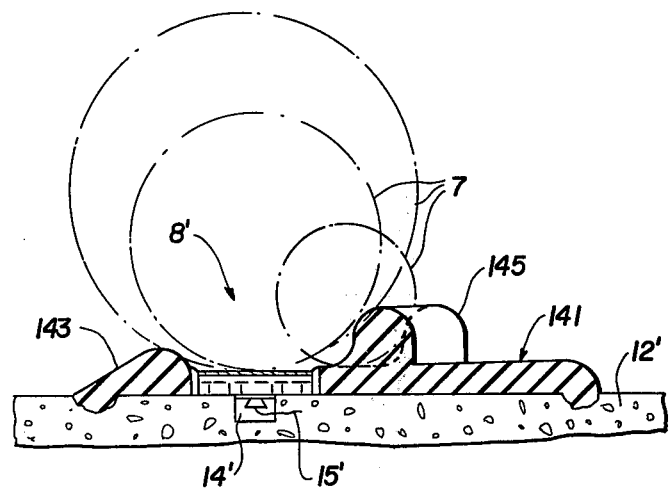
FIG. 11 is a sectional view taken on line 11—11 of FIG. 9.
Figure 9:
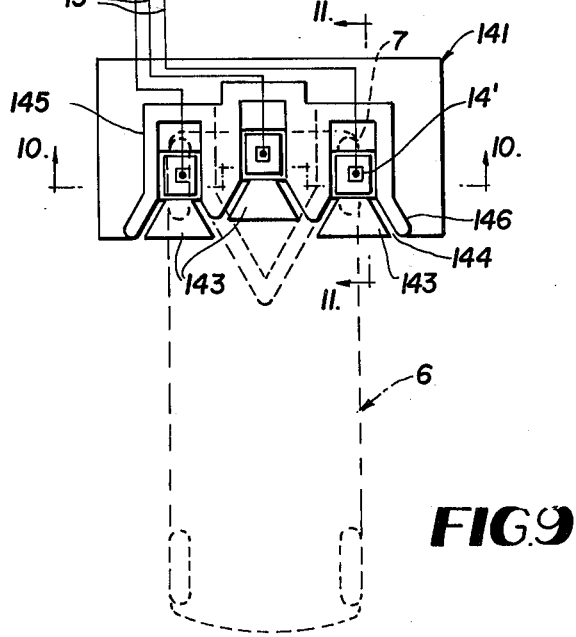
FIG. 9 is a plan view of a parking-charging facility for charging the batteries of a vehicle according to the invention while the vehicle is parked.

Referring now to FIGS. 9–11, it is seen that the batteries of vehicles according to this invention may readily be re-charged from electric energy transmitted through the electrically-conducting tires while the vehicle is parked. This is accomplished by providing a charging facility, designated generally by the reference numeral 140, at a convenient parking place such as in an owner's garage or driveway or in commercial or public parking lots and garages. In the drawings, a three-wire charging facility is disclosed, with the facility illustrated in FIG. 9 as being utilized by a car 6 having a two-wire power system as described above. It is recognized, of course, that parking facilities especially adapted for two-wire systems may be utilized, but detailed description thereof is not deemed necessary herein.

Each parking facility wheel slot 142 (a) is provided with a contact assembly 8' which may be constructed similar to one section of the contact assemblies 8 utilized in the electrified roadway, except that the assemblies 8' are very short. Thus, each assembly 8' employs a junction box 14' which preferably is recessed into the top of a base support 12' such as a garage floor or driveway, with the wires 15' of an A.C. circuit being connected, through the junction boxes and suitable connectors, to (b) one hot bar 28' in each of the assemblies 8'. The hot bar 28' is supported a predetermined fixed distance above the top surface of base 12' as described above with reference to the base sections 25. A top contact plate sub-assembly including a metal plate 32', preferably approximately one foot square and having suitable reinforcing beams 34' secured to its lower surface, and molded in a bed 36' of semi-soft electrically-insulating rubber-like material, is bonded to the top of the base 12' with the bottom surface of plate 32' spaced above the hot bar 28'. Furring members 38' imbedded in the bottom of the bed 36' limit downward movement of the plate 32' to that amount necessary to establish firm pressure contact with the hot bar 28'.

A rollover bumper and vehicle guide 141 molded from a relatively hard electrically-insulating material is bonded to the top surface of support 12', with openings 142 receiving the respective assemblies 8'. An inclined ramp 143 leads up from base 12' to the assemblies 8', with the highest portion of ramps 143 extending above the level of the plate 32' to enable a driver to feel when the tires 7 roll onto the contact assemblies 8', with grooves 144 at each side of the respective ramps 143 providing drainage from the top of assemblies 8'. A somewhat higher bumper, or stop portion 145 of the guide extends along each side and across the back of each of the contact assemblies 8' to assist in guiding the vehicle onto the base assemblies and to stop the vehicle with the tires 7 firmly in contact with the plate 32'. The forward portion 146 of the stop member 145 is flared outward along the ramps 143 to further assist in guiding the vehicle into proper alignment on the charging facility. As illustrated in broken lines in FIG. 11, the size of plate 32' and the location and height of the stop member 145 is such as to permit both relatively large truck wheels as well as smaller car wheels and castered wheels to rest on the plates 32'.

Electrical current is supplied to the charging facility from a conventional three-wire A.C. circuit 147, through a transformer 148, if required, and preferably through a meter 149. A conventional, double-throw fused safety-type switch 150 is provided in the circuit to enable the parking facility to be readily de-energized. However, as with the roadway surface, the surface of the parking facility is normally dead, and energized only upon the application of sufficient weight to depress the bed 36 of rubber-like material sufficiently to establish electrical contact on at least two of the contact assemblies 8', i.e., a relatively negative ground assembly 8' and at least one relatively positive charged assembly 8'.

Once the vehicle is positioned on the charging facility, and with the switch 150 closed and the manually-operated ignition switch 103 on the vehicle opened, the vehicle control system will be functionally inoperative, but current will flow through the voltage regulator 102 to charge the batteries. Once the batteries are charged, the voltage regulator will automatically open the circuit, thereby preventing overcharging in the conventional manner.

By utilizing a separate meter in the charging facility in those instances where the battery charging energy is taken from a metered source as a conventional household circuit, double-charging for energy used can be avoided by merely deducting the amount of energy indicated as being used on meter 149 from that indicated by the vehicle's meter.

The system of this invention has thus far been described as providing for electric energy to flow from the contact assemblies 8 of the roadway to the vehicle only when the contact plate 32 is depressed to establish direct electrical and physical contact between the contact bar 34 on plate 32 and the hot bar 35. However, in operation, this direct physical contact will not always be required to establish a current flow from the contact assemblies to and through the vehicle circuitry. This is made possible by the inductive effect of the electrically conductive wire members 82 which are molded in the body, i.e., tread and side wall portions, of the tires in continuous loops between the tire beads to form an inductive coil. Also, these loops are in electrical contact with the wire reinforcing coils of the tire beads, and additional wire coil means may, if desired, be mounted on the rim portion of the wheels 71. As the vehicle is driven along the roadway with the tires 7 on the plate 32, the individual coils are rotated within the electromagnetic field of the adjacent hot bars of the contact assemblies so that a current is induced in the vehicle circuit. Since the hot bars are connected to an A.C. source, some inductive effect will be produced in the coils even with the vehicle stationary; however, it is apparent that the effect will be greatly increased as the vehicle speed, and consequently the speed of rotation of the inductive coils, is increased.

In summary, existing or newly constructed roadways may be readily and relatively inexpensively electrified in accordance with the present invention. The entire electrification system, including electrical de-icing where required, is applied to the top of a rigid supporting base such as conventional existing concrete roadways, with the only interruption of the normal roadway surface being the requirement for the relatively small recess formed at approximately 1/10th mile centers, necessary for the junction boxes each of which supply electrical energy to corresponding 1/10th mile electrically isolated segments of the pressure contact plate assemblies. These assemblies will have a total thickness of approximately 2 inches, with the top surface of the assemblies being flush with the top of the electrically insulating topping material which forms the wear surface of the roadway. The electrically-insulating wear surface material is poured or cast, in known manner, directly on the top surface of the roadway base, and an adhesive seal is maintained between this topping material and the rubber-like bed 36 of the contact assemblies to maintain a water-tight joint. The electrically-insulating material between adjacent contact assemblies, and the substantial weight required to be applied to top plate 32 to establish electrical contact with the hot bar therebeneath eliminates any hazard to pedestrian traffic. Further, since the top plates 32 are not in contact with one another, only the segment of the roadway directly beneath a vehicle will be energized. Maintenance is facilitated by supplying electrical energy to relatively short isolated segments of the contact assemblies by separate electrical circuits. The roadway can readily be utilized by both electrically operated vehicles according to the present invention and by conventional nonelectric motor vehicles.

The vehicle according to the present invention may be operated on the electrified highway, utilizing the alternating current picked up from the roadway to provide the energy for driving the vehicle and simultaneously charge the battery pack. There is no power interruption when the electrically conducting tires move off the contact assemblies, as the power is automatically taken from the battery pack until such time as contact with the roadway energizing is re-established.

By utilizing an electric-pneumatic drive system, including a reservoir for storing a reserve supply of high pressure air, the main drive motor can be utilized at maximum efficiency, operating under full load until the desired pressure is built up in the air reservoir, then shutting down automatically until the air pressure reaches a predetermined minimum. Further, energy required for braking and normally wasted is mostly conserved in the form of compressed air which is returned to the reservoir and stored for subsequent use.

The use of electrically conductive tires eliminates the necessity of plugging in the vehicle for charging the battery pack when parked off of the electrified highway. This is accomplished by the charging facility having a normally dead surface, with pressure actuated contact plates establishing the electric circuit through the tires and indicated vehicle circuitry to charge the battery pack. With the main ignition switch in the off or open position, re-charging of the battery pack will be automatically controlled by the voltage regulator. Thus, by providing convenient private and public electrified "charge-while-parked" parking facilities, the battery pack of respective electrical vehicles can be conveniently maintained at a near-full charge even when operated off the electric highway, thereby greatly extending the expected battery life and providing a more reliable transportation system than available from conventional electrically-operated vehicles wherein the practice has frequently been to plug-in to re-charge the batteries only when they are approaching full discharge, usually when parking the vehicle overnight or for long periods.

While I have disclosed and described preferred embodiments of my invention, I wish it understood that I do not intend to be restricted solely thereto, but rather that I do intend to include all embodiments thereof which would be apparent to one skilled in the art and which come within the spirit and scope of my invention.

I claim:

1. An automotive vehicle transportation system comprising, in combination,
   A. a roadway having a substantially smooth vehicle supporting road surface,
   B. at least one pair of elongated laterally spaced parallel electrical contact assemblies extending longitudinally of said roadway, said contact assemblies each including
      a. an exposed electrically conductive top surface defined by a plurality of elongated flat metal plate sections,
      b. elongated conductor means extending beneath said top surface in spaced relation to said metal plate sections,
      c. resilient means supporting said plate sections in electrically isolated substantially end-to-end relation to one another with their top surface substantially flush with and forming a part of said rod surface,
   C. supply electric conductor means connected to said elongated conductor means for supplying electric energy thereto, and
   D. an electrically powered vehicle including
      a. a first pair of wheels each having a resilient electrically conductive road engaging tire mounted thereon and electrically isolated from the vehicle, the wheels being mounted one on each side of the vehicle and spaced apart a distance substantially equal to the lateral spacing of said pair of contact assemblies whereby said vehicle may be driven along the roadway with one of said electrically conductive tires in contact with the electrically conductive metal plate members on each of said contact assemblies,
      b. electric motor means for powering the vehicle, and
      c. conductive path means including non-rotating pickup means between said motor means and said electrically conductive tires on said wheels for electrically connecting the tires to each other through said motor means,
   said resilient means of each of said contact assemblies normally maintaining said electrically conductive plate sections out of electrical contact with said elongated conductor means and being depressible by the weight of said vehicle to establish electrical contact between said plate sections and said elongated conductor means for supplying power through said electrically conductive tires to said motor means when said electrically conductive tires are positioned on said electrically conductive top surfaces of said contact assemblies.

2. The invention as defined in claim 1, wherein said supply electrical conductor means comprises one wire of an A.C. circuit connected to each of said contact assemblies, and an A.C. source for supplying electrical energy to said circuit.

3. The invention as defined in claim 1, wherein said vehicle further comprises battery means, means responsive to the completion and interruption, respectively, of electrical contact between said electrically conductive tires and said electrically conductive top surfaces on said contact assemblies for disconnecting and connecting, respectively, said battery means to the conductive path formed by said conductive path means to thereby maintain electrical power to said motor means.

4. The invention as defined in claim 3, further comprising air compressor means operatively connected to said electric motor means to be driven thereby, compressed air distribution means on said vehicle connected to said compressor means, and air motor means connected to said air distribution means for driving said vehicle.

5. The invention as defined in claim 4, wherein said vehicle comprises a second pair of wheels spaced from and in general alignment with said first pair of wheels, and wherein said air motor means comprises four separate air motors each drivingly connected to a separate vehicle wheel, for driving said vehicle.

6. The invention as defined in claim 5, further comprising valve means for selectively disconnecting and re-connecting one of said pair of wheels from said compressed air distribution system during operation of the vehicle.

7. The invention as defined in claim 1, further comprising a third said elongated electrical contact assembly extending longitudinally of said roadway in parallel relation to and between the contact assemblies of each of said at least one pair of contact assemblies, said supply electrical conductor means including means connected to a part of each said third contact assembly for supplying electrical current thereto.

8. The invention as defined in claim 7, wherein said vehicle further comprises a third wheel having an electrically conductive resilient road engaging tire thereon and mounted intermediate said first pair of wheels in position to engage the electrically conductive top surface of said third contact assembly when said electrically conducting tires of said first pair of wheels are in contact with said electrically conductive top surfaces on said pair of contact assemblies.

9. The invention as defined in claim 8 further comprising biasing means normally resiliently urging said third wheel toward said road surface with sufficient force to depress said resilient means to establish electrical contact between said metal plate sections and said elongated conductor means of said third contact assembly when said electrically conductive tire on said third wheel is in contact with said electrically conductive top surface of said third contact assembly.

10. The invention as defined in claim 9 wherein said supply electrical conductor means comprises the wires of a three-wire A.C. circuit connected one to a part of each of said contact assemblies.

11. The invention as defined in claim 10, wherein said vehicle further comprises battery means, means responsive to the completion and interruption, respectively, of electrical contact between said electrically conductive tires on said wheels and said electrically conductive top surfaces on said contact assemblies for disconnecting and connecting, respectively, said battery means on the conductive path formed by said conductive path means to thereby maintain electrical power to said motor means.

12. The invention as defined in claim 11, further comprising air compressor means operatively connected to said electric motor means to be driven thereby, compressed air distribution means on said vehicle connected to said compressor means, and air motor means connected to said air distribution means for driving said vehicle.

13. An automotive vehicle transportation system comprising, in combination,
   a roadway having a substantially smooth road surface,
   at least one pair of elongated laterally spaced parallel electrical contact assemblies extending longitudinally of said roadway, said contact assemblies each having an electrically conductive top surface substantially flush with the road surface,
   supply electric conductor means connected to a part of contact assemblies for supplying electric energy thereto,
   an electrically powered vehicle having conductive wheel means including a pair of wheels each having an electrically conductive road engaging surface thereon mounted one on each side of the vehicle and spaced apart a distance substantially equal to the lateral spacing of said pair of contact assemblies whereby said vehicle may be positioned on the roadway with said electrically conductive surface on one of said wheels in contact with said electrically conductive surface on each of said contact assemblies, said vehicle including,
   electric motor means for powering said vehicle,
   conductive path means between said motor means and said electrically conductive surfaces on said wheels for electrically connecting said electrically conductive surfaces on said wheels to each other through said motor means,
   battery means,
   means responsive to the completion and interruption, respectively, of electrical contact between said electrically conductive surfaces on said wheels and said electrically conductive top surfaces on said contact assemblies for disconnecting and connecting, respectively, said battery means to the conductive paths formed by said conductive path means to thereby maintain electrical power to said motor means,
   air compressor means operatively connected to said electric motor means to be driven thereby,
   compressed air distribution means connected to said compressor means,
   at least one pair of air motors connected to said air distribution system and drivingly connected one to a vehicle wheel on each side of said vehicle for driving the vehicle, and
   proportioning valve means in said air distribution system, said proportioning valve means being operable to vary the proportion of compressed air flowing to the air motors located on the respective sides of the vehicle.

14. The invention as defined in claim 13, wherein said vehicle further comprises steering means for steering one of said pairs of wheels, and wherein said proportioning valve means is operatively connected to said steering means for automatically varying the proportion of air flowing to the wheels on one side of the vehicle relative to the volume flowing to the wheels on the opposite side in response to the positioning of the steering means.

15. The invention as defined in claim 14 wherein said vehicle comprises a second pair of wheels spaced from and in general aligned with said first pair of wheels, and wherein said air motor means comprises four separate air motors each drivingly connected to a separate vehicle wheel for driving said vehicle.

16. For use in an electrical automotive vehicle transportation system, an electrified roadway comprising, in combination,
   a rigid roadway base having a substantially continuous smooth vehicle supporting road surface thereon,
   an electric transmission system comprising at least one pair of elongated electric contact assemblies mounted on said base and extending in spaced parallel relation along the length of said roadway said contact assemblies each having an exposed electrically conductive top surface substantially flush with and forming a part of said smooth road surface, said top surface being defined by a plurality of elongated substantially flat metal plate sections,
   longitudinally extending conductor plate means beneath said top surface in spaced relation to said metal plate sections, said conductor plate means including a plurality of longitudinally extending electrically isolable conductor segments, said supply electrical conductor means including the wires of an A.C. circuit connected one to said part of each of said contact assemblies, and an A.C. source for supplying electric energy connected in said circuit,
   normally open pressure-actuated switch means responsive to a predetermined weight on said top surface for electrically connecting said metal plate sections to said conductor plate means for electrifying said top surface for operating an electrically powered automotive vehicle over said roadway, said pressure-actuated switch means including resilient means supporting said metal plates in spaced relation to said part of said contact assemblies, said resilient means being compressible upon application of said predetermined weight to said metal plates to establish electric contact between said plates and said part of said assemblies, whereby said plates are connected to said supply conductor means, and
   wherein said substantially smooth road surface comprises a layer of electrically insulating material molded on the top of said base, said layer of electrically insulating material extending between and being joined to the side edges of said elongated contact assemblies.

17. The invention as defined in claim 16, wherein said contact assemblies each comprise a plurality of separately formed sub-assemblies adapted to be joined in end-to-end relation.

18. The invention as defined in claim 17, wherein said plurality of sub-assemblies are joined together and electrically connected in electrically-isolated contact assembly segments, said segments each being connected to one wire of an A.C. circuit.

19. The invention as defined in claim 18, further comprising electrical resistance heating means extending beneath the top of said layer of electrically-insulating material and said metal plates.

20. The invention as defined in claim 19, wherein said electrical transmission system comprises a third contact assembly disposed in spaced parallel relation to and located between the contact assemblies of each of said at least one pair of contact assemblies.

21. The invention as defined in claim 20, wherein said roadway comprises a plurality of parallel traffic lanes, and wherein each of said traffic lanes has located therein three of said parallel contact assemblies.

22. For use in an electrical automotive vehicle transportation system, an electrified roadway comprising, in combination,
- a rigid roadway base having a substantially continuous smooth vehicle supporting road surface thereon,
- an electric transmission system comprising at least one group each consisting of three elongated electric contact assemblies mounted on said base and extending in spaced parallel relation to one another along the length of said roadway in position to be contacted simultaneously by three laterally spaced road-engaging members on a single vehicle passing thereover, said contact assemblies each having an exposed electrically conductive top surface substantially flush with and forming a part of said smooth road surface, said top surface being defined by a plurality of elongated substantially flat metal plate sections,
- longitudinally extending conductor plate means beneath said top surface in spaced relation to said metal plate sections, said conductor plate means including a plurality of longitudinally extending electrically isolable conductor segments,
- supply electrical conductor means extending below said road surface and connected to each of said electrically isolable conductor segments, and
- normally open pressure-actuated switch means responsive to a predetermined weight on said top surface for electrically connecting said metal plate sections to said conductor plate means for electrifying said top surface for operating an electrically powered automotive vehicle over said roadway.

23. The invention as defined in claim 22, wherein said supply electrical conductor means comprises the wires of a three-wire A.C. circuit connected one to a part of each of said contact assemblies.

24. An electrically powered automotive vehicle for operation on a generally smooth road surface and having a frame structure supported by wheels including a pair of laterally spaced wheels mounted one on each side of the vehicle, said vehicle comprising,
- D.C. motor means for powering the vehicle,
- an electrically conductive road-engaging tire on each of said pair of laterally spaced wheels,
- means electrically insulating said conductive tires from said vehicle frame structure,
- connecting means including non-rotating contact means on said vehicle for establishing electrical contact with the conductive tires on each of said pair of wheels,
- conductive path means including said connecting means between said motor means and each of said conductive tires for electrically connecting the tires to one another through said motor means,
- said conductor path means including transformer means for reducing the voltage of an A.C. current, and rectifier-converter means for converting the reduced voltage A.C. current to D.C. current for use by said motor means when said electrically conductive tires are in electrical contact with an A.C. electric power source,
- battery means connected in said conductive path between said motor means and said rectifier means for supplying electrical energy to said motor means,
- switching means responsive to the completion and interruption, respectively, of an energized electric circuit through said conductive tires on said pair of wheels for disconnecting and connecting, respectively, said battery means in said conducting path to thereby continuously maintain D.C. power to said motor means during operation of the vehicle,
- air compressor means drivingly connected to said electric motor means to be driven thereby,
- compressed air conduit means connected to said air compressor means, and
- air motor means connected to said conduit means and operable to drive said vehicle.

25. The invention as defined in claim 24, wherein said electrically conductive tires comprise a resilient tire molded from an electrically insulating material having electrically-conductive wires molded therein, said wires including wire members extending to the road-engaging surface of the tire.

26. The invention as defined in claim 24, wherein said switching means comprises means for supplying electric energy to said battery means through said electrically-conductive tires on said laterally spaced wheels to thereby charge the battery means.

27. The invention as defined in claim 26, wherein said switching means comprises a voltage regulator connected in said conductive path means for controlling the voltage to said motor means and to said battery means.

28. The invention as defined in claim 27, further comprising air compressor means drivingly connected to said electric motor means to be driven thereby, compressed air conduit means connected to said air compressor means, and air motor means connected to said conduit means and operable to drive said vehicle.

29. The invention as defined in claim 24, wherein said vehicle has at least four wheels, and wherein said air motor means comprises four separate air motors each connected to a separate vehicle wheel, said air motors each being operatively connected to said compressor means through said conduit means to drive the vehicle wheel connected thereto.

30. The invention as defined in claim 29, wherein said wheels are arranged in front and rear pairs of laterally spaced wheels, and further comprising valve means for selectively disconnecting and re-connecting one of said pair of wheels from said compressed air conduit system during operation of the vehicle.

31. The invention as defined in claim 24, wherein said conduit means comprises reversing valve means operable to reverse the flow of air through said air motor means to thereby convert said air motor means to air compressor means.

32. The invention as defined in claim 31, wherein said vehicle comprises operator-controlled brake actuator means, and wherein said reversing valve means is responsive to actuation at said brake actuator means whereby said air motor means is converted to air compressor means upon application of the vehicle brakes whereby said air motor means, when converted to compressor means, acts as vehicle brakes.

33. The invention as defined in claim 32 wherein said conduit means comprises air reservoir means, and means for conducting air compressed by said air motor means when converted to air compressor means to said reservoir means to thereby salvage energy required for braking the vehicle for subsequent use to power the vehicle.

34. The invention as defined in claim 24, wherein said road-engaging wheels comprises a third wheel having an electrically conductive road-engaging tire thereon, said third wheel being disposed on said vehicle intermediate said pair of laterally-spaced wheels, said connecting means and said conductive path means electrically connecting said tire of said third wheel in said electric circuit.

35. An electrically powered automotive vehicle for operation on a generally smooth road surface and having a frame structure supported by road engaging wheels including a pair of laterally spaced wheels mounted one on each side of the vehicle and electric motor means for powering the vehicle, said vehicle comprising, means defining an electrically conductive road engaging surface portion on said pair of laterally spaced wheels, means electrically insulating said conductive surface portions from the vehicle frame structure, conducting means including non-rotating contact means on said vehicle for establishing electrical contact with the conductive surface portion of each of said pair of wheels, conductive path means including said connecting means between said motor means and said conductive surface portions for electrically connecting said conductive surface portions to one another through said motor means to thereby complete an electric circuit for supplying power to said motor means when said electrically conductive surface portions are in electrical contact with an electrical power source, air compressor means drivingly connected to said electric motor means to be driven thereby, compressed air conduit means connected to said compressor means, a pair of air motors connected one to each of a pair of laterally spaced wheels mounted one on each side of said vehicle and operable to drive said vehicle, and proportioning valve means in said air conduit system, said proportioning valve means being operable to vary the proportion of compressed air flowing to the pair of air motors.

36. The invention as defined in claim 35, wherein said vehicle further comprises steering means for steering one of said pairs of wheels, and wherein said proportioning valve means is operatively connected to said steering means for automatically varying the proportion of air flowing to the air motor on one side of the vehicle relative to the volume of air flowing to the air motor on the opposite side in response to the position of the steering means.

37. Drive-on, automatic battery charging means for use with an electrically powered vehicle including a D.C. motor and conductive path means including an electrically conductive road-engaging tire on at least two laterally spaced wheels for supplying electrical energy to the motor from supply conductors on the surface of a roadway and connected to a source of electrical energy, and batteries operatively connected in the conductive path for supplying energy to the D.C. motor to power the vehicle only when the electrically conductive tires are not in contact with supply conductors on the roadway, said battery charging means comprising, a plurality of electrically conductive metal plate members mounted one in position to engage each of the electrically conductive road-engaging tires on the vehicle wheels, a pressure-actuated switch disposed beneath each of said metal plate members, supply conductor means for connection to a source of electrical energy, said supply conductor means including a separate wire of an A.C. electric circuit connected to each of said pressure actuated switches, said pressure-actuated switches each being normally open whereby said plate members are normally deenergized and adapted to be closed by the weight of the vehicle when the electrically conductive road-engaging tires are disposed on said metal plate members to thereby supply electric energy to the conductive path means of the vehicle, rectifier-converter means connected in the conductive path of the vehicle for converting A.C. current to D.C. current, and means connected in said conductive path means for completing an electrical circuit between said plate members through said battery means to supply D.C. current to the batteries to charge the batteries when the vehicle is positioned with said conductive road-engaging tires on said plate members.

38. The invention as defined in claim 37, further comprising a support surface, means mounting said plate members in vertically spaced relation above said support surface, and electrically insulating means surrounding each of said plate members, said electrically insulating means including ramp means to facilitate driving onto and off of said plates.

39. The invention as defined in claim 38, wherein said battery charging means comprises three of said electrically conductive plate members arranged in laterally spaced relation, said supply conductor means comprises the wires of a three-wire A.C. circuit connected one to each of said plate members, and wherein said conductive path means comprises an A.C. to D.C. converter.

40. The invention as defined in claim 39, wherein said conductive path means on said vehicle comprises a voltage regulator for controlling the voltage in the circuit to said electric motor, said means for completing an electric circuit between said plate members through said battery means comprising said voltage regulator.

* * * * *